US005790956A

United States Patent [19]
Lo et al.

[11] Patent Number: 5,790,956
[45] Date of Patent: Aug. 4, 1998

[54] METHOD OF PROVIDING SELECTIVELY TARGETED TALKGROUP COMMUNICATIONS

[75] Inventors: Bin Lo, Glen Ellyn; Paul M. Erickson, Palatine; Peter M. Drozt, Bartlett, all of Ill.

[73] Assignee: Motorola, Inc., Schaumburg, Ill.

[21] Appl. No.: 880,009

[22] Filed: Jun. 20, 1997

Related U.S. Application Data

[63] Continuation of Ser. No. 333,106, Nov. 1, 1994, abandoned.
[51] Int. Cl.$^6$ .................................................. H04B 7/00
[52] U.S. Cl. .......................... 455/512; 455/518; 455/519
[58] Field of Search ........................... 455/509, 518, 455/519, 520, 524, 527, 528, 512

[56] References Cited

U.S. PATENT DOCUMENTS

| | | | |
|---|---|---|---|
| 5,126,733 | 6/1992 | Sagers et al. | 455/38.1 |
| 5,513,381 | 4/1996 | Sasuta | 455/54.2 |
| 5,537,684 | 7/1996 | Cassidy et al. | 455/54.2 |
| 5,551,063 | 8/1996 | Brandon et al. | 455/54.2 |
| 5,634,197 | 5/1997 | Paavonen | 455/58.1 |

*Primary Examiner*—Edward F. Urban
*Attorney, Agent, or Firm*—George C. Pappas

[57] ABSTRACT

The present invention encompasses a method of providing communication service to members of a talkgroup in a radio communication system (100). A typical system (100) includes a plurality of communication units (116–122), a plurality of communication sites (106–112), and a central controller (114) that communication resources among the communication units (116–122). Upon receipt of a request for a talkgroup call from a communication unit, the central controller (114) grants the talkgroup call request for the first talkgroup. When the central controller (114) receives, during the first call, a talkgroup call request for the same talkgroup, the controller (114) agglomerates the two concurrent talkgroup calls, thereby providing communication service to all members of the talkgroup using a single communication resource.

15 Claims, 3 Drawing Sheets

METHOD OF PROVIDING SELECTIVELY TARGETED TALKGROUP COMMUNICATIONS

This is a continuation of application Ser. No. 08/333,106, filed Nov. 1, 1994 and now abandoned.

FIELD OF THE INVENTION

The present invention relates generally to communication systems and, in particular, to talkgroup communication within a communication system.

BACKGROUND OF THE INVENTION

Land mobile radio communication systems are known in the art. Such systems typically include a plurality of communication units, a plurality of communication sites, and a controller that allocates a limited number of communication resources among the plurality of communication units. A talkgroup call is one in which one communication resource is allocated to a group of communication units, each of which can communicate to the other units via the allocated resource. This is achieved through the use of a central controller and a database within the communication system, tracking communication units as to location area and talkgroup membership information.

As is also known in the art, a communication system may serve a large population of communication units and include a plurality of communication sites. In prior art communication systems, communication units are able to initiate talkgroup calls to other members of the same talkgroup in only one of two ways: wide-area or local area. In wide area communication mode, all members of the talkgroup at all communication sites are included in the talkgroup call, while in local-area communication mode, all members of the talkgroup at the requesting communication unit's communication site are included in the talkgroup call.

In more recent developments, communication systems have been made capable of selectively targeting a subset of the talkgroup members. That is, selected-area talkgroup calls include the talkgroup members located at the initiating communication unit's communication site and the talkgroup members located at another communication site selected by the initiating communication unit.

In prior art communication systems, wide-area talkgroups and local-area talkgroups are defined to be exclusive. That is, the same talkgroup cannot be used for both wide-area and local-area calls. Consequently, in a wide-area talkgroup, the targeted talkgroup can only be involved in wide-area communications. After a first communication request is received and the talkgroup call is granted, all talkgroup members are involved in the same talkgroup call. Once involved in a talkgroup call, a communication unit cannot concurrently request a talkgroup call for the same talkgroup. Similarly, in prior art local-area talkgroups, all members of the targeted talkgroup will be involved in the local-area communication. Consequently, a member of the talkgroup cannot request concurrent communication. However, with the introduction of selectively targeted talkgroup calls, not all members of a talkgroup will be involved in every communication for the talkgroup. This leads to the possibility that additional, concurrent talkgroup communication requests can be received from talkgroup members who are not currently involved in the talkgroup call.

Accordingly, there exists a need for a method of providing selectively targeted talkgroup communications, while simultaneously permitting subsequent talkgroup call requests from talkgroup members not targeted. Further, such a method that allowed multiple talkgroup communications among members of geographically dispersed talkgroups on a single communication resource would be an improvement over the prior art.

DETAILED DESCRIPTION OF THE PREFERRED EMBODIMENT

Generally, the present invention encompasses a method of providing selectively targeted talkgroup communication in a radio communication system. When a talkgroup call request is received from a communication unit, the system controller allocates the necessary resources to grant the talkgroup call. When the system controller receives a second talkgroup call request during the first talkgroup call from a communication unit that is registered with the first talkgroup, the system controller grants the second request by agglomerating the communication sites involved in the second talkgroup call with those involved in the first talkgroup call.

Figure 1:
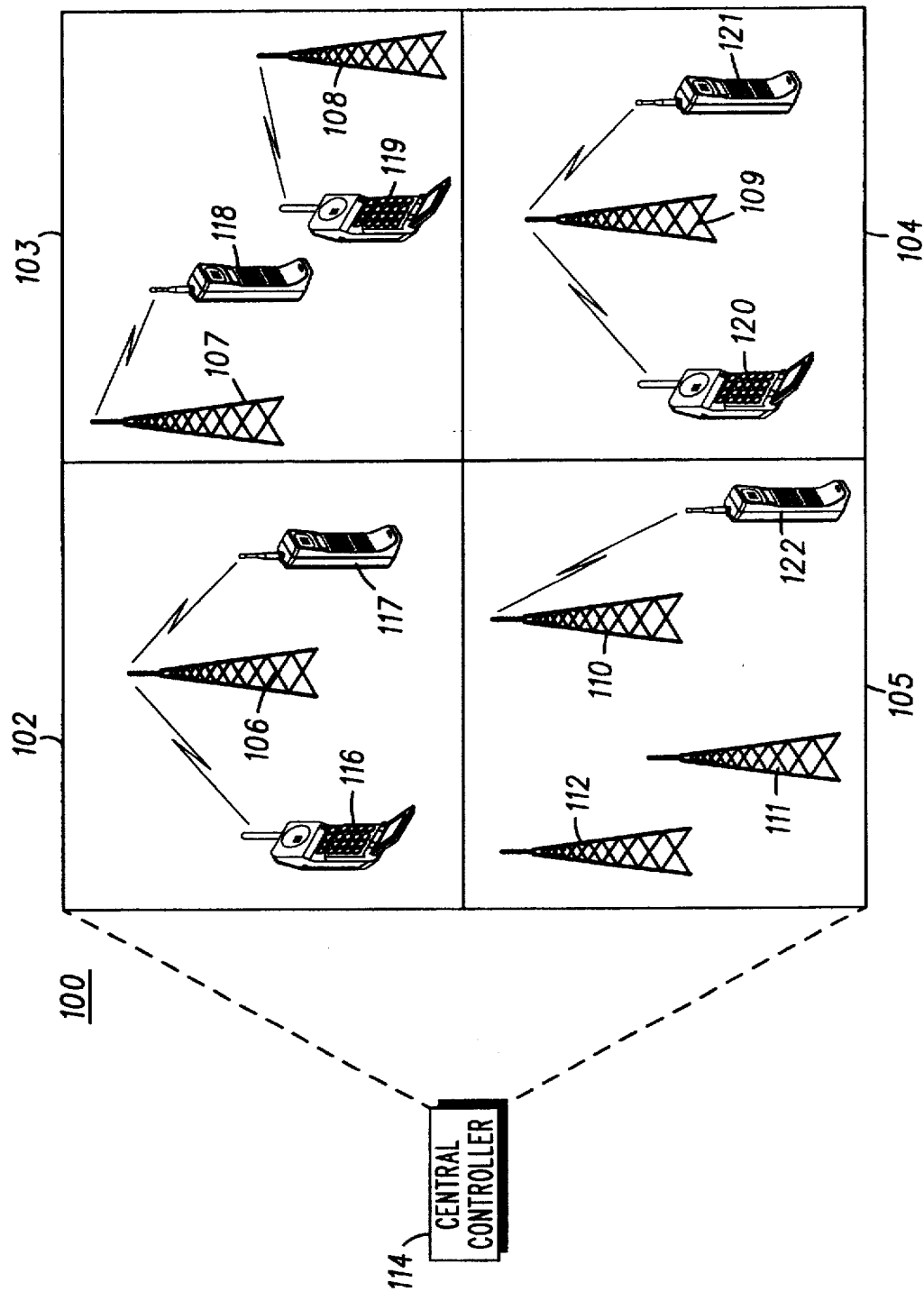
FIG. 1 shows a radio communications system, in accordance with the present invention.
Figure 2:
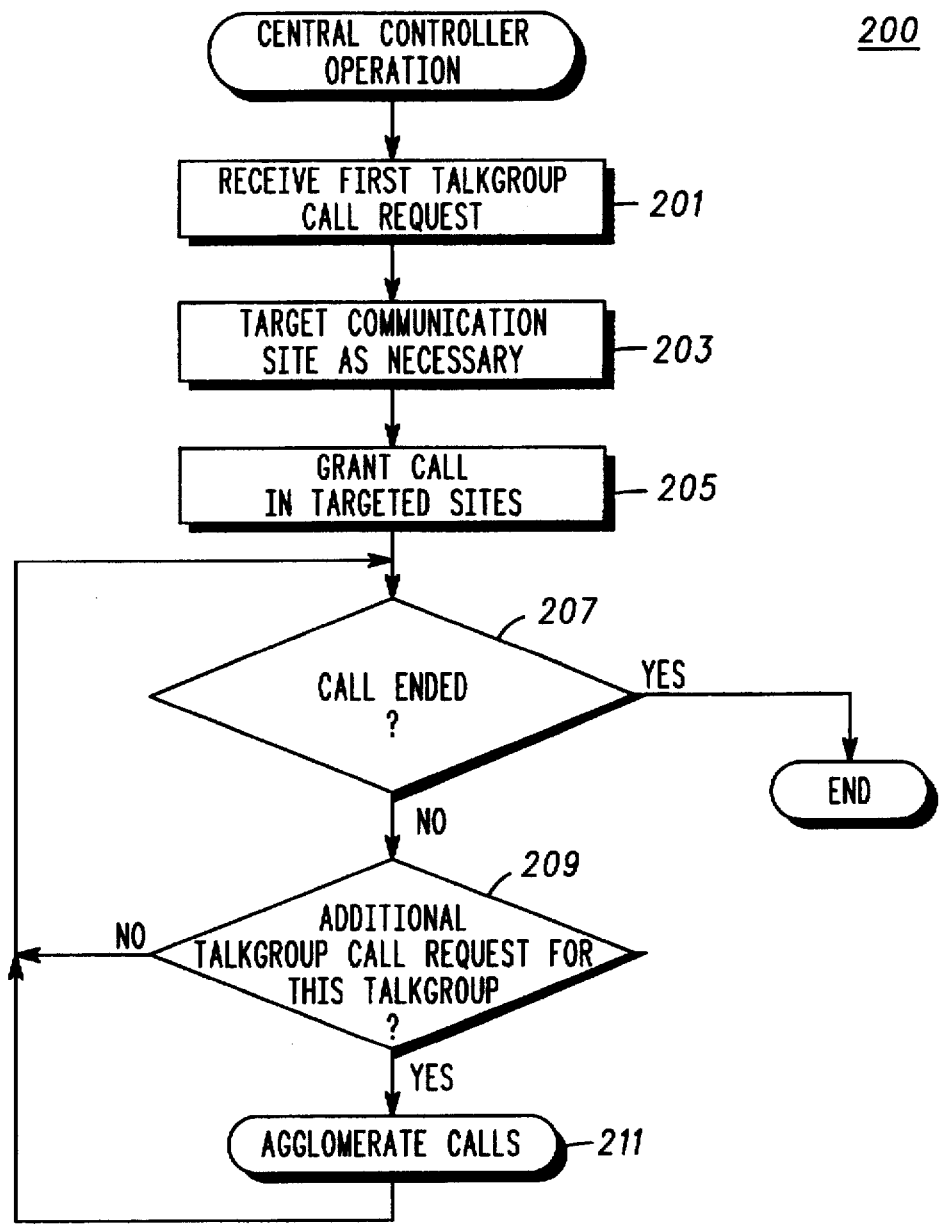
FIG. 2 shows a data flow diagram depicting operation of the central controller, in accordance with the present invention.
Figure 3:
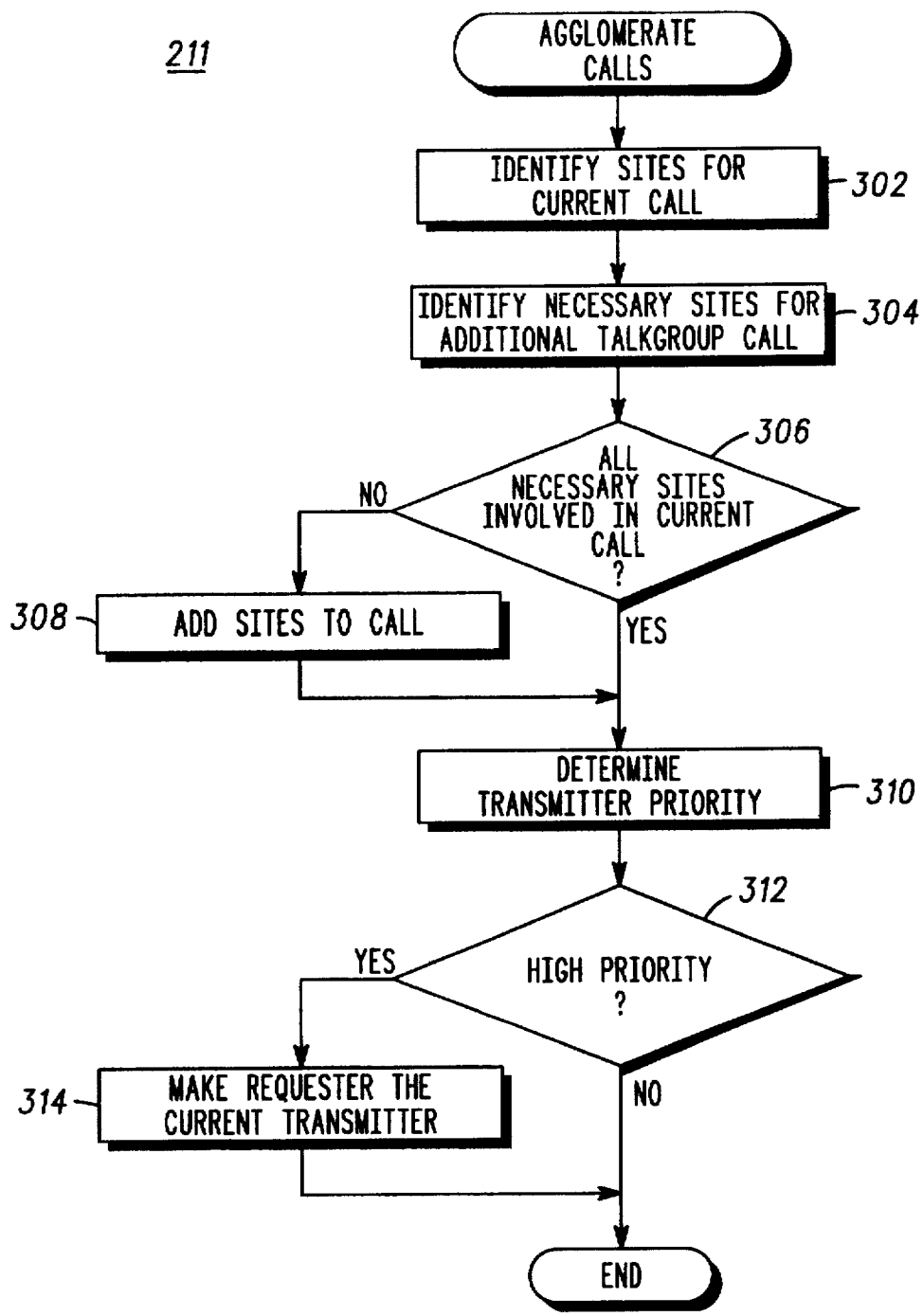
FIG. 3 shows a data flow diagram depicting a more detailed view of the call agglomeration process shown in FIG. 2.

The present invention can be better understood with reference to FIGS. 1–3. FIG. 1 shows a communication system (100), in accordance with the present invention. Location areas (102–105) generally represent overlapping communication sites servicing a geographical area. The geographical area is partitioned as shown and communication service is provided by communication sites (106–112), wherein multiple sites are used in some areas (103, 105) and a single site is used in other areas (102, 104). The communication sites (106–112) are coupled to a central controller (114), which provides centralized control for the allocation of communications resources throughout the system (100). That is, communications resources are allocated to service a plurality of communication units (116–122), and particularly to those units that are members of a common talkgroup. For purposes of the discussion herein, it will be assumed that communication units (116–122) are all members of a common talkgroup.

As earlier mentioned, members of a common talkgroup roaming from a first area (102) to a second area (103) would lose, at least temporarily, talkgroup services, including any current talkgroup calls. By using call agglomeration, a talkgroup call is able to be continued when a communication unit roams into a new service area that is currently not involved in the talkgroup call. Since all communication sites that contain talkgroup calls for a common talkgroup are agglomerated into a single talkgroup call, as later described, a communication unit is able to continue receiving and participating in talkgroup calls as it roams from site to site.

FIG. 2 shows a flow diagram (200) depicting the operation of a central controller, in accordance with a preferred embodiment of the present invention. Upon receipt (201) of a first talkgroup call request, the central controller targets (203) the necessary communication sites. In a preferred embodiment, this is accomplished by identifying those selected sites that need to be included in the talkgroup call.

By way of example, the central controller might poll all of the communication sites in the selected areas to identify specific sites that include members of the talkgroup.

Once the appropriate communication sites are targeted, the talkgroup call is granted (205) in a manner that is known in the art. The ongoing call is then monitored (207) to determine whether the call has ended, at which time the routine is exited in the normal fashion.

During the call, however, if additional talkgroup calls are requested (209), the calls are agglomerated (211), as described with reference to FIG. 3. In this manner, talkgroup services are maintained in a talkgroup call across communication sites. Without agglomeration, talkgroup calls could be handled using one of two methods. The first method is to allow multiple independent talkgroup calls within a common talkgroup. Two problems arise with this method. The first is that call requests that share a common communication site cannot be completed, since the communication units in the common communication site are already involved in a talkgroup call. The second problem with this method occurs when a communication unit moves from a communication site currently involved in a talkgroup call to another communication site containing a concurrent call for the same talkgroup. The roaming communication unit will be unable to continue its original communication.

The second method for handling concurrent talkgroup calls without agglomeration is processing one talkgroup call request at a time. The limitation of this method occurs when the selected communication sites do not overlap. In this scenario, the second talkgroup call request would be prevented unnecessarily, since the two concurrent talkgroup call requests are requesting separate communication sites. Accordingly, there exists a distinct advantage of providing selectively targeted talkgroup capabilities as well as call agglomeration, as next described.

FIG. 3 shows a data flow diagram (211), further detailing the call agglomeration process shown in FIG. 2. Once a call is to be agglomerated, the active sites for the current call are identified (302). The sites necessary for the additional talkgroup call are then identified (304) so that the agglomerated call can be broadcast in these sites as well. A decision is then reached to determine (306) whether all necessary sites have been added to the current call. If not, the sites are added (308) to the broadcast list as necessary to complete the agglomeration process. The transmitter priority is then determined (310) in accordance with a set of predetermined rules, as next described.

Typically, it is assumed that the currently transmitting communication unit has the same or higher priority than the communication unit making the new communication request. In this case, the currently transmitting communication unit continues to transmit and the requesting communication unit becomes a listener in the agglomerated call. In certain scenarios, however, the requesting communication unit might have a higher priority than the current transmitting communication unit. These scenarios include there not being a current transmitter, a communication request indicating a higher priority call type (i.e. emergency), a communication request from a communication unit that has a higher user priority, or a request from a communication unit that services a larger communication area (i.e. wide-area communication mode over local-area communication mode). In these cases, the requesting communication unit assumes transmitting priority, while the current transmitting communication unit becomes a listener in the agglomerated call.

Once the priority has been determined, a comparison (312) is made between the newly determined priority and the existing transmission priority. If the new transmission priority is lower, the routine is exited. However, if the transmission priority for the newly added talkgroup call is higher, the requester of the added talkgroup call is designated (314) the current transmitter before the routine is exited. In this manner, a predetermined rule can be implemented to select which of the plurality of concurrent transmissions will be heard my listening members of the talkgroup.

The present invention provides a method for facilitating selectively targeted talkgroup communications. Multiple site talkgroup communications are provided through an agglomeration of concurrent talkgroup calls that are made across geographically dispersed communication sites. Further, by agglomerating the talkgroup calls in the foregoing manner, multiple talkgroup communications are managed through the use of predetermined transmission priority rules.

What is claimed is:

1. In a radio communication system that provides selectively targeted talkgroup communications, a method of providing communication service to members of a talkgroup, the method comprising the steps of:

receiving, from a first member of a talkgroup, a first request for a first call involving a first subset of the members of the talkgroup;

granting the first request, thereby allowing a first communication on a communication resource;

receiving, during the first communication, a second request for a second call, from a second member not included in the first subset, involving a second subset of the members of the talkgroup;

selecting one of the first call and the second call as having a higher transmitting priority; and granting, during the first communication, the second request, thereby allowing a second communication on the communication resource, wherein the second communication is concurrent with the first communication, wherein the step of selecting comprises the steps of:
identifying a first user priority for the first call;
identifying a second user priority for the second call; and
identifying one of the first call and the second call as having transmitting priority, based at least in part on the first user priority and the second user priority.

2. The method of claim 1, further comprising the step of targeting a first of a plurality of communication sites that contain at least some of the first subset of the members of the talkgroup.

3. The method of claim 2, wherein the step of targeting comprises the step of, at an initiating member of the talkgroup, identifying the first communication site by selecting one of a plurality of communication modes.

4. The method of claim 3, wherein the step of identifying comprises the step of identifying the first communication site by selecting a wide-area communication mode.

5. The method of claim 3, wherein the step of identifying comprises the step of identifying the first communication site by selecting a local-area communication mode.

6. The method of claim 3, wherein the step of identifying comprises the step of identifying the first communication site by selecting a local communication site in addition to at least one other communication site.

7. The method of claim 2, wherein the step of targeting comprises the steps of:

at a central controller;

determining which of the plurality of communication sites presently have registered therewith at least one member of the first subset; and routing the first call to those sites having registered therewith at least one member of the first subset.

8. In a radio communication system that provides selectively targeted talkgroup communications, a method of providing communication service to members of a talkgroup, the method comprising the steps of:

receiving, from a first member of a talkgroup, a first request for a first call involving a first subset of the members of the talkgroup;

granting the first request, thereby allowing a first communication on a communication resource;

receiving, during the first communication, a second request for a second call, from a second member not included in the first subset, involving a second subset of the members of the talkgroup;

selecting one of the first call and the second call as having a higher transmitting priority; and granting, during the first communication, the second request, thereby allowing a second communication on the communication resource, wherein the second communication is concurrent with the first communication, wherein the step of selecting comprises the steps of:
identifying a first call start time for the first call;
identifying a second call start time for the second call; and
identifying one of the first call and second call as having transmitting priority, based at least in part on the first call start time and the second call start time.

9. In a radio communication system that provides selectively targeted talkgroup communications, a method of providing communication service to members of a talkgroup, the method comprising the steps of:

receiving, from a first member of a talkgroup, a first request for a first call involving a first subset of the members of the talkgroup;

granting the first request, thereby allowing a first communication on a communication resource;

receiving, during the first communication, a second request for a second call, from a second member not included in the first subset, involving a second subset of the members of the talkgroup;

selecting one of the first call and the second call as having a higher transmitting priority; and granting, during the first communication, the second request, thereby allowing a second communication on the communication resource, wherein the second communication is concurrent with the first communication, wherein the step of selecting comprises the steps of:
identifying a first call type for the first call;
identifying a second call type for the second call; and
identifying one of the first call and the second call as having transmitting priority, based at least in part on the first call type and the second call type.

10. In a radio communication system that provides selectively targeted talkgroup communications, a method of providing communication service to members of a talkgroup, the method comprising the steps of:

receiving, from a first member of a talkgroup, a first request for a first call involving a first subset of the members of the talkgroup;

granting the first request, thereby allowing a first communication on a communication resource;

receiving, during the first communication, a second request for a second call, from a second member not included in the first subset, involving a second subset of the members of the talkgroup;

selecting one of the first call and the second call as having a higher transmitting priority; and granting, during the first communication, the second request, thereby allowing a second communication on the communication resource, wherein the second communication is concurrent with the first communication, wherein the step of selecting comprises the steps of:
identifying a first communication mode for the first call;
identifying a second communication mode for the second call; and
identifying one of the first call and the second call as having transmitting priority, based at least in part on the first communication mode and the second communication mode.

11. In a radio communication system servicing a plurality of talkgroup (TG) members collectively defining a set of TG members dispersed throughout a plurality of service areas collectively defining a TG coverage area, capable of establishing a targeted communication to a first subset of said set of TG members currently present in a first targeted service area, a method of establishing a second communication involving at least the first subset and a second subset of said set of TG members currently present in a second targeted service area, the method comprising the steps of:

while a targeted communication is still active, identifying a request for a new communication to a at least the second subset of TG members from a new-call requesting TG member who is not in the first subset, is outside the first targeted service area and is within the TG coverage area;

agglomerating the targeted communication and the new communication to establish the second communication involving both the first subset in the first targeted service area and at least the second subset in the second targeted area, thereby collectively defining an agglomerated subset amongst said set of TG members; and selecting, on the basis of a predetermined rule, either the targeted communication or the new communication as the currently active call.

12. The method of claim 11, wherein said step of selecting involves the steps of:

identifying, at substantially the same time as the request for the new communication, whether talking is occurring on the targeted communication currently active;

when talking is not identified, selecting the new communication as the second communication, allowing the new-call requesting member to be heard by the agglomerated subset; and when talking is identified, selecting the targeted communication as the second communication, such that all TG members currently associated with the agglomerated subset will hear the ongoing targeted communication.

13. The method of claim 12, wherein the agglomerated subset and said set are the same.

14. The method of claim 12, wherein the agglomerated subset is smaller than said set, there remaining at least a third subset of the set not participating in the second communication, and which members of the third subset where not targeted.

15. The method of claim 12, wherein said step of selecting involves the steps of:

identifying, at substantially the same time as the request for a new communication, a priority of either the new-call requesting member or of the request, and selecting, on the basis of the identified priority, between the targeted communication and the new communication.

* * * * *